Patented May 3, 1927.

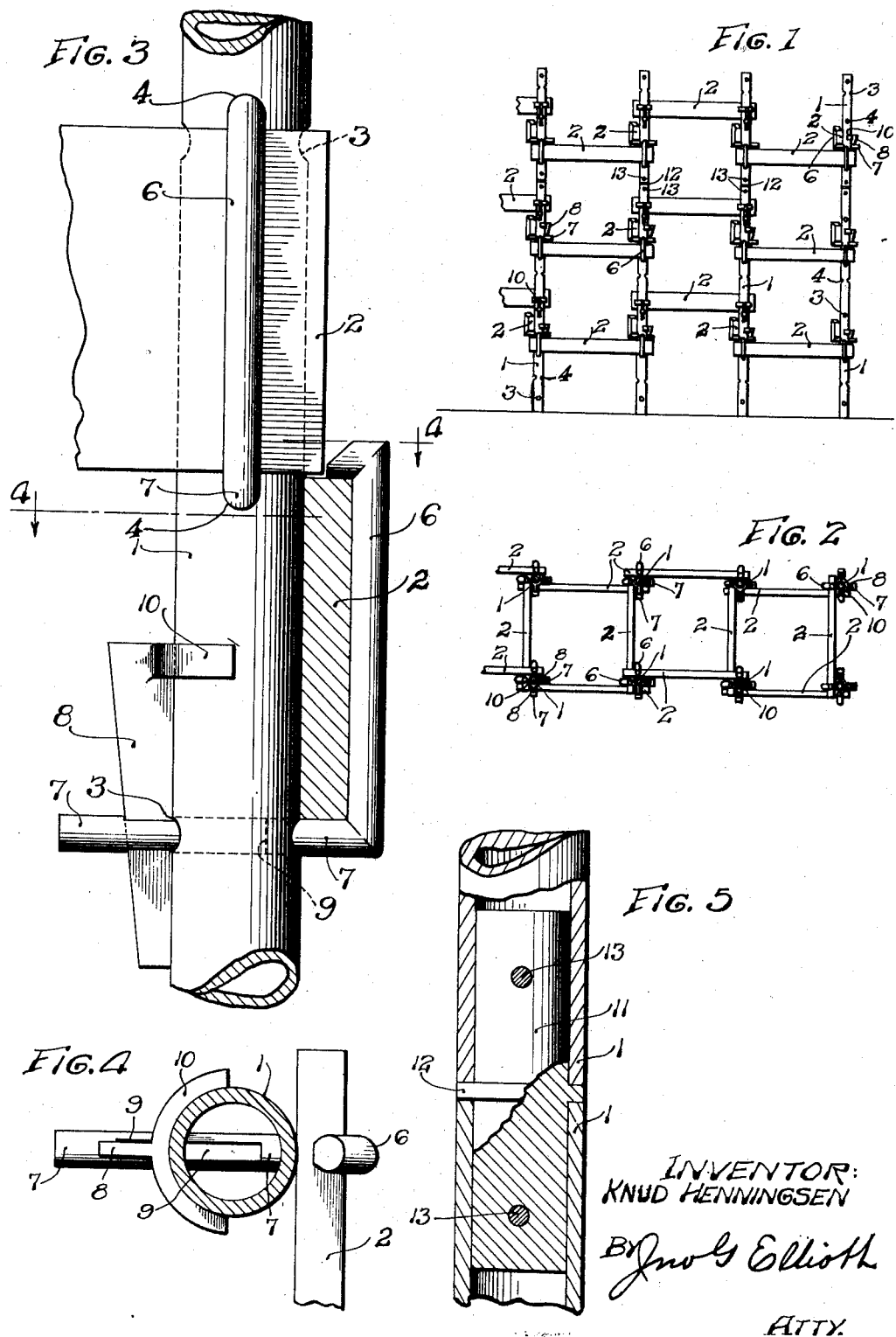

1,627,177

UNITED STATES PATENT OFFICE.

KNUD HENNINGSEN, OF CHICAGO, ILLINOIS.

CLAMP FOR SCAFFOLDING OR THE LIKE.

Application filed December 4, 1924. Serial No. 753,894.

My invention relates to improvements in scaffolding, the construction of which is such that it may be set up, knocked down, and transported from one place to another.

The object of this invention is to provide a clamp that may be readily applied for connecting two parts of a scaffold or the like or any two members in angular relation, and the invention primarily consists in engaging means having embracing wings or means that engage one of said members for preventing a turning movement of the clamp.

With these ends in view, my invention finds embodiment in certain features of novelty in the construction, combination and arrangement of parts by which the said objects and certain other objects are attained, all as hereinafter fully described with reference to the accompanying drawings and more particularly pointed out in the claim.

In said drawing,—

Fig. 1 illustrates in front elevation a scaffolding in which my invention finds embodiment.

Fig. 2 is a top plan view thereof.

Fig. 3 is an enlarged detail in front elevation of one of the stanchions therefor, showing two of the runners and the locking devices therefor for securing them in their operative position.

Fig. 4 is a transverse section taken on the line 4—4 of Fig. 3; and

Fig. 5 is a front elevation partly in section, illustrating in its operative position a coupling connection for extending the stanchions.

Similar characters of reference indicate the same parts in the several figures of the drawing.

The stanchions 1 and runners 2 constitute the main frame of the scaffold of my invention, said stanchions preferably being made of iron or steel pipes or tubes, the bottom ones resting upon a foundation of suitable material, in the usual manner, to prevent sinking or changes in alinement and to give stability to the scaffold as a whole.

The stanchions 1 are of standard length and provided with transverse axial holes 3, located at fixed intervals thereof, and with holes 4 located at 90 degrees with reference to the holes 3, and which lie midway between the holes 3.

The runners 2 preferably consist of wooden joists held in place by clutch bolts 6 inserted through the holes 3, as hereinafter described.

It will now be noticed that when the runners are placed closely together alternately on the inner and outer sides of the stanchions, that the holes 3 are so placed as to be available for allowing the placing of floor joists or boards (not shown) so that they will extend between and bridge the opposing runners when so placed.

The runners 2 are fastened and locked together in their operative position by the clutch bolts 6, the arms 7 of which project through the holes 3 and 4 in the stanchions and are locked by wedges 8 inserted through slots 9 in the bolts, from which wedges project lateral semicircular extensions 10 adapted to embrace and grip the curved surfaces of the stanchions and prevent the clutch bolts from turning. The upper ends of said bolts 6 are turned parallel with their lower ends 7 to engage over the upper faces of the runner 2, as shown in Figure 3.

The stanchions are preferably of standard length, but, for increasing the height of the scaffold, from time to time, I employ a cylindrical coupling 11 projecting into the opposing ends of two stanchion sections, which coupling is provided with a flange 12 resting upon the lower and supporting the upper stanchion section, and to which it is secured by drift pins or clutch bolts 13 passing through opposing holes drilled through both stanchion sections.

The scaffold of my invention is erected in four-sided units, the fourth side of one unit providing the adjacent side of the other unit, and there may be added to the first unit an unlimited number of other units for the lateral extension of the scaffold, without limit, and while at the same time the clutch bolt of my invention is adapted to render the structure rigid throughout, regardless of its length and height.

My invention is not to be limited to the precise details of construction or arrangement herein shown and described, but includes any other means within the scope of the appended claim for securing the results attributable thereto.

Having described my invention, what I claim and desire to secure by Letters Patent is:

A scaffolding clamp comprising a device having a slotted arm adapted for insertion through a member of the scaffolding, a wedge extending through said slotted arm and having oppositely and forwardly extending wings adapted for embracing said member for preventing a rotational turning movement of said arm and means extending from said arm for supporting another member of the scaffolding.

KNUD HENNINGSEN.